Figure 1:
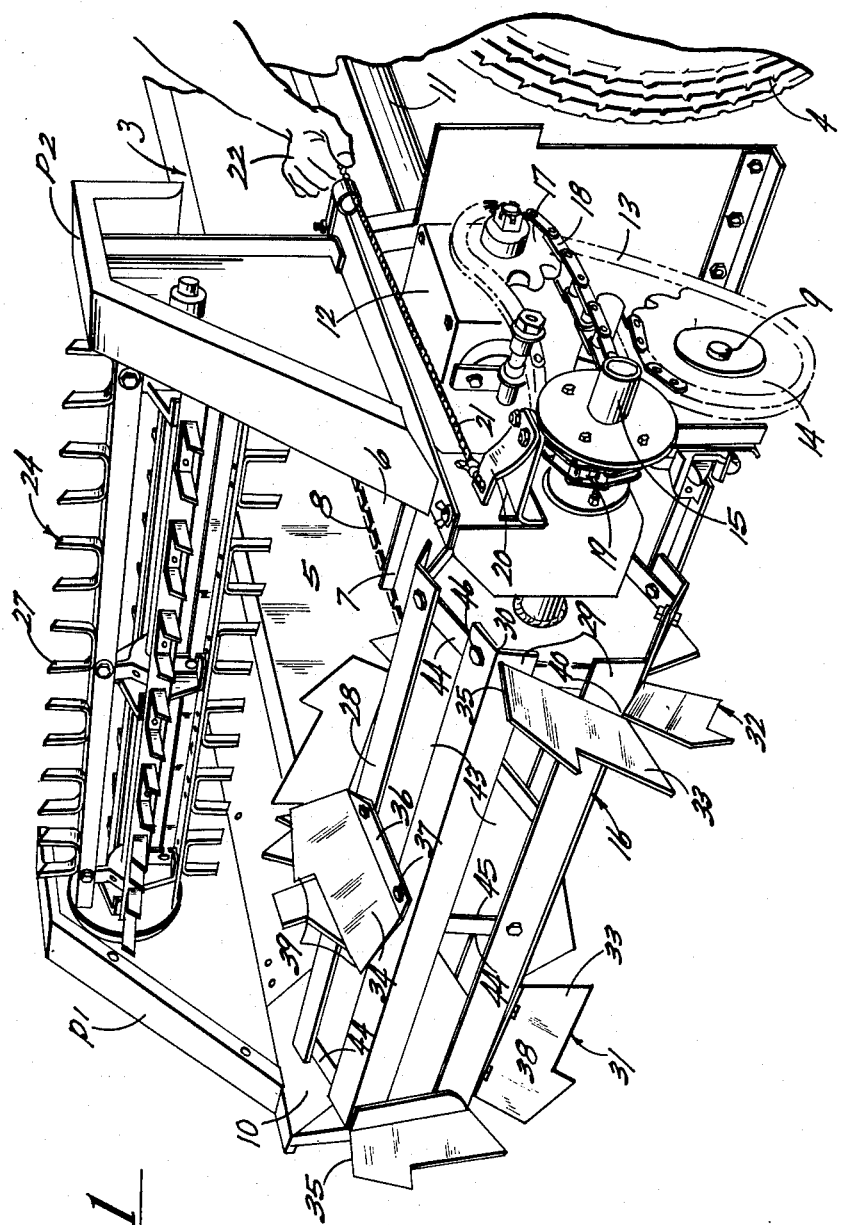

April 20, 1965   LA VERNE H. SCHULTZ ETAL   3,179,420
MANURE SPREADER BEATER
Original Filed Oct. 31, 1962   2 Sheets-Sheet 2

INVENTORS
LA VERNE H. SCHULTZ
HAROLD H. McLELAND
ATTORNEY

United States Patent Office 3,179,420
Patented Apr. 20, 1965

3,179,420
MANURE SPREADER BEATER
La Verne H. Schultz, Rochelle, Ill., and Harold H.
McLeland, Cedar Falls, Iowa, assignors to L. H.
Schultz Manufacturing Company, Rochelle, Ill., a
corporation of Illinois
Continuation of application Ser. No. 234,495, Oct. 31,
1962. This application Apr. 23, 1964, Ser. No. 363,670
16 Claims. (Cl. 275—6)

This application is a continuation of our copending application, Serial No. 234,495, filed October 31, 1962, now abandoned.

This invention relates to manure spreaders and is more particularly concerned with improvements in an all-purpose rotary beater designed to give wide and fairly uniform distribution besides all of the shredding necessary for all manures from the light fluffy chicken litters to the heaviest green bedded cattle manures, these results being achieved partly by virtue of a specially designed drum of open or skeleton construction giving highly desirable aerodynamic effects never before obtained and of maximum benefit with the lighter and finer materials, and partly by virtue of the novel shape and arrangement of blades and beater bars on the periphery of the drum.

In our improved rotary beater, which is used by itself, we incorporate in a novel way all of the facilities for good reduction and proper spreading of the manure heretofore requiring a plurality of rotary beaters, as, for example, an upper beater and a lower beater and a widespread. In the beater of our invention:

(1) A drum of regular polygonal cross-section, preferably hexagonal, is provided of open or skeleton construction, not only for lightness and simplicity and economy of production but also to provide six V-shaped beater bars on the six corners of the hexagon to give the desired air impeller action as well as good deflection of solids, the drum being disposed on a horizontal axis at the rear of and crosswise relative to an endless conveyor on the bottom of the box of the manure spreader that feeds the material to the beater;

(2) Two series of straight shredding and deflecting blades are secured to the beater bars on the flats on the periphery of the drum beginning at the middle and angled outwardly in diverging relationship to one another to define two complete 360° spirals, one right hand, the other left hand, the neighboring blades of each spiral being disposed with their end portions overlapping but spaced axially for good manure pickup and elimination, the overlapping of the end portions making for better shredding while the spaced relationship of the overlapped end portions is highly important in picking up air and deflecting it out toward the ends of the beater for improved spreading, this result being not obtainable with continuous or unbroken spirals, and (3) All of the blades are alike and interchangeable, each having an elongated attaching flange resting firmly on the flat periphery of the hexagonal drum and secured to the beater bars enabling good and secure fastening in a simple way, as by cap screws, and an elongated upright and substantially radial straight baffle and beater portion at right angles to said flange, the radially outer edge of which is cut away to define preferably only two large saw-like teeth to obtain greater penetration into the manure and secure better shredding action and better deflection, while the axial spacing of the overlapped end portions makes it possible for lengths of twine to be thrown outwardly by centrifugal force so that the beater is truly self-cleaning.

Figure 2:
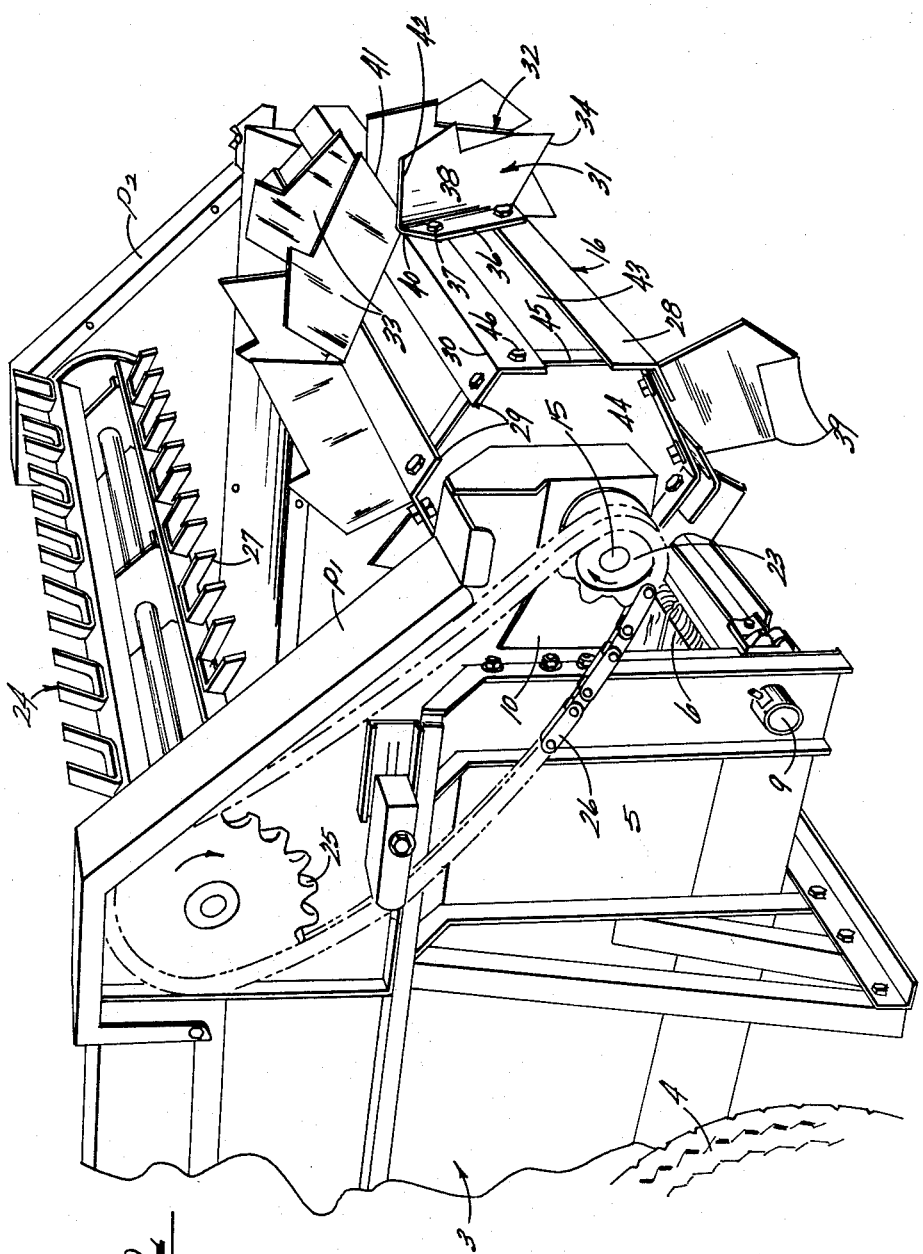

In the accompanying drawings:

FIGURE 1 is a perspective view of the rear end of a manure spreader showing our improved beater, with the cover for the drive sprockets and chains on one side removed to expose these parts and showing also the manually controlled clutch, enabling easy starting and stopping of the rotary beater, and FIGURE 2 is a similar perspective taken from the other side of the manure spreader, again with the cover for the drive chain and sprockets on that side removed to expose these parts.

The same reference numerals are applied to corresponding parts in these two views.

Referring to the drawings, the reference numeral 3 designates a conventional forage wagon or load feeder suitable for carrying a load of manure, the same running on wheels 4 and designed to be pulled behind a tractor in the usual way to transport the load of manure in the box 5 to the field to be fertilized thereby, the bottom 6 of the box having an endless apron or conveyor 7 made up of a number of regularly spaced parallel cross-pieces operated over the top thereof by means of a pair of chains 8 on opposite sides of the box connected to the ends of these cross-pieces and driven by sprockets on a rear cross-shaft 9 to move slowly toward the open rear end 10 of the box, the lower flight of the apron 7 extending under the box and moving forwardly about and over other sprockets on an idler shaft at the front end of the box, as is well known in the art. The shaft 11 extending along one side of the box to the gear box 12 is driven in the usual way through a manually controlled clutch from a power takeoff provided on the tractor, so that the apron 7 can be driven by means of shaft 9 in the manner described whenever the operator on the tractor clutches the power takeoff shaft on the tractor, the necessary speed reduction being obtained by worm and gear reduction gearing in box 12 through which chain 13 driving sprocket 14 on shaft 9 is driven, in a well-known manner. A separate drive from shaft 11 for the drive shaft 15 of beater 16 is provided by bevel gears in the box 12 driving sprocket 17, which drives chain 18 and sprocket 19, the latter turning freely on shaft 15 but being connectible to said shaft when a clutch operable by lever 20 and flexible pullrope 21 is operated by hand at the handle end of the rope, as indicated at 22 in FIG. 1. The beater 16, which, as clearly shown in FIG. 2, is of a diameter about equivalent to the height of the box 5 disposed above and substantially level with the bottom 6 of box 5 with about a third of its diameter projecting into the open rear end of the box, and leaves a small clearance space of about an inch and a fraction between it and the apron 7 at the rear end of the box bottom 6, and, hence, when there is a small amount of manure left in the box, not enough to warrant further operation of the beater, the clutch at 19 will be disengaged but the apron 7 will be allowed to continue unloading manure through this small clearance space between the beater 16 and the bottom of box 5 until the last of the manure has been unloaded, whereupon the power takeoff clutch on the tractor is disengaged by the operator to stop driving the shaft 11. Beater 16 is designed to be used by itself, as previously mentioned, but in this disclosure happens to be shown with a manure levelling rotor or drum 24 of smaller diameter driven with it in the same direction. Beater 16 is arranged to be driven in the direction of the arrow shown on sprocket 23 in FIG. 2 and, accordingly, the manure levelling drum 24, which, as best seen in FIG. 2, is spaced forwardly relative to the beater and about level with the top thereof, is driven in the same direction as said beater, as indicated by the arrow on its drive sprocket 25, sprockets 23 and 25 being connected by chain 26 to drive drum 24 at about half the speed of beater 16. The U-shaped blades 27 on drum 24 serve to break up clumps of manure, but the blades 27 on this drum serve mainly to level off any too high portions of a pile of manure, so that the manure is delivered at a fairly uniform volume to the beater 16 for the final reduction and spreading. Plates P1 and P2 secured on opposite sides of the box 5 at the open rear end provide bearing support for the shafts carrying the beater 16 and drum 24. As will now be described, the single rotary beater 16, by virtue of its improved design and despite its simplicity of construction incorporates all of the facilities for reduction and spreading of the manure heretofore requiring a plurality of rotary beaters.

The beater 16 comprises a hexagonal drum 28 of open or skeleton construction fixed on and turning with shaft 15 extending therethrough on the longitudinal axis thereof, the six flat surfaces thereon, each defined by coplanar halves of a pair of spaced parallel sheet metal beater bars or strips 29 bent to V-section along the center line, as indicated at 30, serving as air impellers and manure beaters and deflectors as well as supports for two reversely spiralled sets or flights 31 and 32 of elongated straight blades 33 for breaking up and shredding the manure and spreading it as widely and evenly as possible, the two flights (each consisting of six blades) commencing at the middle of the drum, as at 34, and extending to the opposite ends thereof, each in one complete 360° spiral or helix, as seen at 35 in FIG. 1. The two spirals 31 and 34 being complete and all of the blades 33 being alike, and the drum 28 itself being of a balanced symmetrical design and construction, the beater 16 is evenly balanced to run smoothly, and, as will soon appear, it is self-cleaning and does not accumulate twine and manure on it to throw it out of balance. The blades 33, being alike, are interchangeable. Each blade 33 comprises a flat longitudinally extending straight attaching bottom flange 36 fastened by cap screws 37 to the beater bars 29 in flat surface to surface abutment, the blade having an elongated straight upright and substantially radial baffle and beater portion 38 bent at right angles to and of the same length as the flange 36, the radially outer edge of said portion 38 having preferably two large widely spaced saw-like teeth 39 defined thereon, each with the leading edge extending substantially radially of the drum. The consecutive blades of each spiral or helix are axially offset a little relative to one another, as seen at 40, to permit having leading edges 41 overlap trailing edges 42 circumferentially for improved aerodynamic action and also for a better shredding action and to provide an escape passageway between the spaced overlapping edges 41 and 42 for the pieces of twine that are present invariably in the manure from the baled bedding and otherwise wrap to a certain extent on any true and uninterrupted or unbroken spiral or helix, even though the same had a similar tooth configuration. Twine winding in any amount around a beater greatly reduces the manure reduction effectiveness of the beater, in extreme cases building up to the point of forming a solid cylinder having virtually no lifting or beating action left. The gaps 40 between adjacent ends of blades 33 make the present beater truly self-cleaning, as we have found that twine does not tend to wrap around the drum but is thrown off the spaced overlapping blades by centrifugal action. If, despite the self-cleaning construction, any small amount of twine happens to get wound around the drum 28, the longitudinal spaces 43 between strips 29 permit entry of a knife to cut the twine and enable the easy and speedy removal thereof. The open or skeleton construction, besides giving the advantage of lightness, is what enables the aerodynamic action obtainable with the V-shaped beater bars 29 working in combination with the spirally arranged axially spaced but circumferentially overlapping blades 33. The offset leading edges of the blades 33 tend to pick up air and the air is then deflected laterally by the blades toward the ends of the beater 16. This feature alone is the reason this beater is so successful in spreading chicken manure. Actual tests with dry powdery chicken litter about the consistency of bran showed average deflection and pattern of 12 to 15 feet. Even the old 3-beater spreaders will not spread this light material at all effectively. The drum 28 has three coaxially spaced hexagonal frame plates 44 mounted on the center drive shaft 15 and fastened by means of their peripheral flanges 45 to the strips 29 by cap screws 46, some of these cap screws serving also to fasten flanges 36 of blades 33 to the drum 28.

In operation, the middle portion of each blade 33 lies on a hypothetical spiral or helix around the drum 28, but, since every blade is straight, a gap 40 is left between the leading edge 41 of one blade and the trailing edge 42 of the next blade. In addition to the axial spacing seen at 40, there is also some overlap of edges 41 and 42 relative to one another. This spacing and overlapping is of major importance from the standpoint of the aerodynamic action, as it causes air to be picked up at the offset leading edges of the blades, and this air is then deflected laterally by the blades toward the ends of the beater 16, this accounting for the success we have had in handling powdery materials like chicken litter and spreading it over a wider area than was ever possible before with other spreaders. The aerodynamic action is, of course, beneficial in the spreading of other manures also but is especially beneficial with the lighter materials. With the working side surface of each blade in a straight line, each blade as it picks up a small amount of manure is free to eject and deflect this material upwardly and rearwardly from the rear of wagon 3 by centrifugal action but on an acute angle from the longitudinal center line of the box 5. With a continuous spiral, on the other hand, the only possible deflection from a straight line is due to what little penetration of the manure can take place with the addition of peripheral teeth, and, with such an arrangement, the spiral surface is only slightly effective for deflection of manure particles, whereas with our construction there is good ejection and deflection due to the opportunity for greater penetration of the manure by the deflecting side surfaces of each blade. At high speeds, (as, for example, 500–550 r.p.m.) only the radially outermost edge portions 30 of the beater bars 29 come into contact with the manure, thus reducing likelihood of adhesion and any tendency for buildup of any coating of manure on or in the drum to a minimum. The novel form and makeup of the two spirals 31 and 32, and the gaps 40 between neighboring blades in each spiral make the beater self-cleaning as any twine coming in the manure is, we have found, usually thrown off the blades by centrifugal action, whereas with a continuous unbroken spiral the tendency is for twine to wind onto the drum. Any small amount of twine that might wind on the drum can with our construction be easily freed by cutting the same by entering a knife in any of the spaces 43 between bars 29. Manure is an elastic medium and with our two complete 360° spirals 31 and 32, one left hand and the other right hand, both made up of straight blades 33 set in the novel relationship herein disclosed, we have achieved the following three further distinct advantages:

(1) Greater penetration of the manure by the deflecting side surfaces of the blades 33 due to the fact that at any given area on any one blade there is contact with that area of the blade only once per revolution, thus allowing time for a manure particle so contacted to fall toward the periphery of the hexagonal drum, and, consequently, that means greater penetration of the blade surfaces, which, coupled with the high speed of rotation of the drum accounts for greatly increased deflection of the manure and hence wider spreading despite the simplicity of the present construction;

(2) With the right hand and left hand acute angling of the blades 33 on the two spirals, starting at the middle of the drum, the same number of blades (six) being employed in each 360° spiral, and these spirals being of equal overall length, the drum is obviously evenly balanced, statically and dynamically, and (3) Low cost of production is realized by the novel construction of the hexagonal drum 28 and the use of twelve blades 33, all of the same size and shape and therefore interchangeable, thus requiring only one set of dies for their stamping and forming.

It is believed the foregoing description conveys a good understanding of the objects and advantages of our invention. The appended claims have been drawn to cover all legitimate modifications and adaptations.

We claim:

1. A rotary beater for a manure spreader adapted to be operated on a horizontal axis immediately behind the box of said spreader and have the manure to be spread delivered from the box rearwardly to the beater by suitable conveyor means, said beater comprising a drum of regular polygonal cross-section and skeleton construction having flat air impeller bars extending lengthwise of the drum and defining the points of the polygon and adapted to serve as blade supports, and two substantially 360° spiral series of straight elongated blades, each of said blades being toothed on its radially outer edge and secured at opposite ends of its radially inner edge substantially in right angle relation to said drum on a neighboring pair of said air impeller bars at an acute angle relative to the longitudinal center line of the box, the blades of one series being angled one way and defining a right hand spiral extending from the middle of said drum to one end thereof and the blades of the other series being angled the reverse way and defining a left hand spiral extending from the start of the first series to the other end of the drum, each blade extending substantially the full width of one flat surface on the periphery of the drum and having only the mid-point of its length on a hypothetical true spiral, the leading and trailing ends of neighboring blades in each series being spaced relative to one another axially of the drum.

2. A rotary beater as set forth in claim 1 wherein the leading and trailing ends of neighboring blades in each series extend in overlapping relation to one another circumferentially of said drum.

3. A rotary beater as set forth in claim 1 wherein said air impeller bars are V-shaped in cross-section and arranged with the apex of the V radially outermost so as to throw air outwardly from the drum.

4. A rotary beater as set forth in claim 1 wherein said air impeller bars are V-shaped in cross-section and arranged with the apex of the V radially outermost so as to throw air outwardly from the drum, the leading edges of said blades by virtue of their axial spacing relative to the trailing edges of neighboring blades in the same series picking up air and deflecting it laterally toward opposite ends of the drum.

5. A rotary beater as set forth in claim 1 wherein the teeth on the radially outer edge of each of said blades consists of at least two circumferentially elongated saw teeth of appreciable radial dimension.

6. A rotary beater as set forth in claim 1 wherein the teeth on the radially outer edge of each of said blades consists of at least two circumferentially elongated saw teeth of appreciable radial dimension, with the leading edge of each tooth extending substanially radially with respect to said drum.

7. A rotary beater as set forth in claim 1 wherein there are air spaces left between the edges of neighboring air impeller bars through which a knife may be entered and moved lengthwise of the drum to cut away twine if some gets wound around the periphery of said drum.

8. A rotary beater for a manure spreader adapted to be operated on a horizontal axis immediately behind the box of said spreader and have the manure to be spread delivered from the box rearwardly to the beater by suitable conveyor means, said beater comprising a drum of regular polygonal cross-section and skeleton construction having flat air impeller bars extending lengthwise of the drum and defining the points of the polygon and adapted to serve as blade supports, and two substantially 360° spiral series of straight elongated blades, each of said blades being toothed on its radially outer edge and secured at opposite ends of its radially inner edge substantially in right angle relation to said drum on a neighboring pair of said air impeller bars at an acute angle relative to the longitudinal center line of the box, the blades of one series being angled one way and defining a right hand spiral extending from the middle of said drum to one end thereof and the blades of the other series being angled the reverse way and defining a left hand spiral extending from the start of the first series to the other end of the drum, each blade extending substantially the full width of one flat surface on the periphery of the drum and having only the midpoint of its length on a hypothetical true spiral, the leading and trailing ends of neighboring blades in each series being spaced relative to one another axially of the drum, the air impeller bars being V-shaped in cross-section with the apex of the V radially outward relative to the axis of rotation of the drum to define the points of the polygon, each bar providing two flanges for support and fastening of the adjacent ends of two neighboring blades of both series of blades.

9. A rotary beater for a manure spreader adapted to be operated on a horizontal axis immediately behind the box of said spreader and have the manure to be spread delivered from the box rearwardly to the beater by suitable conveyor means, said beater comprising a drum of regular hexagonal cross-section defining flat faces on the six sides of the hexagon, the flat faces having longitudinally extending openings of appreciable width provided therein defining flat air impeller bars on opposite sides thereof, and two substantially 360° spiral series of straight elongated blades, each of said blades being toothed on its radially outer edge and secured by its radially inner edge substantially in right angle relation to said drum on a flat peripheral face thereof at an acute angle relative to the longitudinal center line of the box, the blades of one series being angled one way and defining a right hand spiral extending from the middle of said drum to one end thereof and the blades of the other series being angled the reverse way and defining a left hand spiral extending from the start of the first series to the other end of the drum, each blade extending substantially the full width of one flat surface on the periphery of the drum and having only the mid-point of its length on a hypothetical true spiral, the leading and trailing ends of neighboring blades in each series being spaced relative to one another axially of the drum.

10. A rotary beater as set forth in claim 9 wherein the leading and trailing ends of neighboring blades in each series extend in overlapping relation to one another circumferentially of said drum.

11. A beater as set forth in claim 9 wherein said drum has air thrown outwardly therefrom through said longitudinal openings.

12. A beater as set forth in claim 9 wherein said drum has air thrown outwardly therefrom through said longitudinal openings, the leading edges of said blades by virtue of their axial spacing relative to the trailing edges of neighboring blades in the same series picking up air and deflecting it laterally toward opposite ends of the drum.

13. A rotary beater as set forth in claim 9 wherein the teeth on the radially outer edge of each of said blades consists of at least two circumferentially elongated saw teeth of appreciable radial dimension.

14. A rotary beater as set forth in claim 9 wherein the teeth on the radially outer edge of each of said blades consists of at least two circumferentially elongated saw teeth of appreciable radial dimension, with the leading edge of each tooth extending substantially radially with respect to said drum.

15. A rotary beater as set forth in claim 9 wherein said longitudinal openings are also adapted to receive a knife movable lengthwise of the drum to cut away twine if some gets wound around the periphery of said drum.

16. A rotary beater for a manure spreader adapted to be operated on a horizontal axis immediately behind the box of said spreader and have the manure to be spread delivered from the box rearwardly to the beater by suitable conveyor means, said beater comprising a drum of regular hexagonal cross-section defining flat faces on the six sides of the hexagon, the flat faces having longitudinally extending openings of appreciable width provided therein defining flat air impeller bars on opposite sides thereof, and two substantially 360° spiral series of straight elongated blades, each of said blades being toothed on its radially outer edge and secured by its radially inner edge substantially in right angle relation to said drum on a flat peripheral face thereof at an acute angle relative to the longitudinal center line of the box, the blades of one series being angled one way and defining a right hand spiral extending from the middle of said drum to one end thereof and the blades of the other series being angled the reverse way and defining a left hand spiral extending from the start of the first series to the other end of the drum, each blade extending substantially the full width of one flat surface on the periphery of the drum and having only the mid-point of its length on a hypothetical true spiral, the leading and trailing ends of neighboring blades in each series being spaced relative to one another axially of the drum, there being V-shaped surfaces defined at the junctions of the flat air impeller bars on the six points of the hexagonal drum with the apex of each V radially outward relative to the axis of rotation of the drum, the adjacent trailing and leading ends of two neighboring blades of both series being fastened to the drum on said flat air impeller bars on opposite sides of the apex of the V.

References Cited by the Examiner
UNITED STATES PATENTS

| | | | |
|---|---|---|---|
| 993,640 | 5/11 | Barnard | 275—3 |
| 1,328,618 | 1/20 | Cook | 275—5 |
| 2,969,986 | 1/61 | Dyke | 275—6 |
| 3,069,172 | 12/62 | Beiler | 275—6 |

ANTONIO F. GUIDA, *Acting Primary Examiner.*
WILLIAM A. SMITH, III, *Examiner.*